United States Patent [19]

Wyman

[11] 4,070,922
[45] Jan. 31, 1978

[54] ROTOR BALANCING DEVICES

[75] Inventor: Howard John Wyman, Kenilworth, England

[73] Assignee: Chrysler United Kingdom Limited, London, England

[21] Appl. No.: 727,657

[22] Filed: Sept. 29, 1976

[30] Foreign Application Priority Data

Oct. 7, 1975  United Kingdom .............. 41064/75

[51] Int. Cl.$^2$ ..................... F16F 15/22; F16C 1/00; F16C 3/00
[52] U.S. Cl. .................................. 74/573 R; 33/84; 64/1 V
[58] Field of Search .................... 64/1 V, 1 R; 33/84; 74/572, 573, 574

[56] References Cited

U.S. PATENT DOCUMENTS

| | | | |
|---|---|---|---|
| 829,251 | 8/1906 | Booraem | 74/573 |
| 986,978 | 3/1911 | Heine | 74/572 |
| 2,722,848 | 11/1955 | Stein | 74/573 |
| 3,234,644 | 2/1966 | Hollander | 74/572 X |
| 3,659,434 | 5/1972 | Wolfe | 74/573 X |
| 3,939,020 | 2/1976 | Caramanian et al. | 74/573 |

FOREIGN PATENT DOCUMENTS

| | | | |
|---|---|---|---|
| 1,120,762 | 12/1961 | Germany | 74/573 |
| 832,048 | 4/1960 | United Kingdom | 74/573 |

*Primary Examiner*—Samuel Scott
*Assistant Examiner*—Don E. Ferrell
*Attorney, Agent, or Firm*—Edward F. Connors

[57] ABSTRACT

The rotor balancing device disclosed herein comprises a cylindrical cup-shaped housing for mounting in a hollow rotor to be balanced having a central pivot on which two bushes are mounted. Two bob weights are connected by tension springs or other restraining devices to the two respective bushes to rotate about a pivot within the housing wall. The inner side of the housing wall and/or the weights have a coating of a contact or thermally activated adhesive. The restraining force of the tension springs is such that when the shaft in which the balancing device is mounted is rotated to a speed between natural frequencies of the vibration of the shaft and is nearer the lower frequency (i.e. in a mass controlled state) so that the weights in the balancing device assume positions in which any out-of-balance in the shaft is counter balanced by the weights, the springs are extended sufficiently to allow the weights to contact the inner side of the housing and are secured thereto permanently by the adhesive to balance the shaft permanently.

11 Claims, 6 Drawing Figures

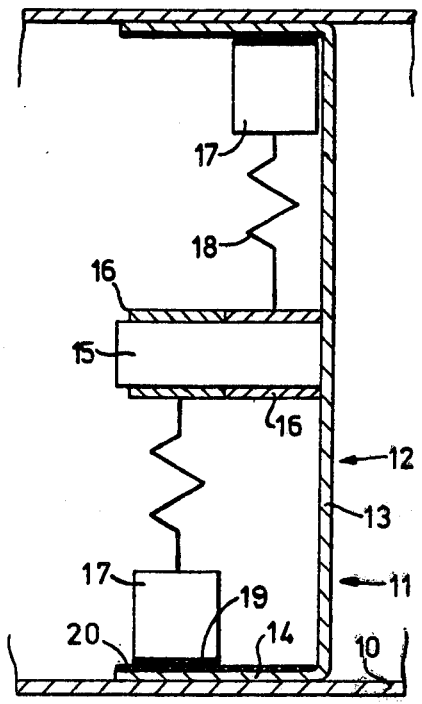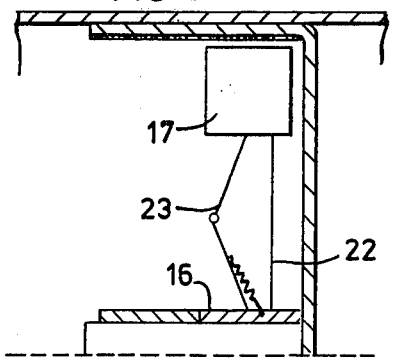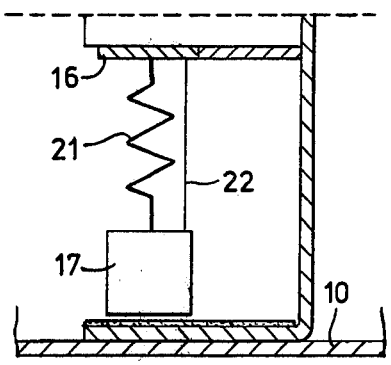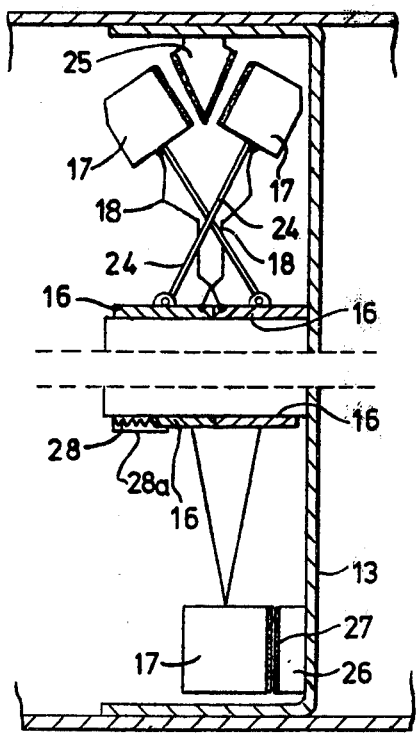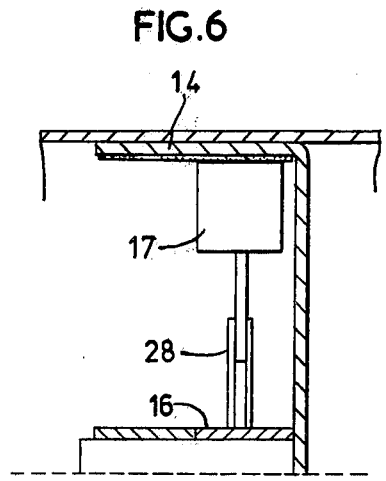

ROTOR BALANCING DEVICES

BACKGROUND OF THE INVENTION

1. Field of the Invention

The invention relates to rotor balancing devices and is particularly although not exclusively applicable to balancing devices for motor vehicle propeller shafts.

2. Description of the Prior Art

U.K. Patent No. 832048 discloses an autmtic balancing device comprising a housing having an annular cavity filled with a dampening fluid, for example oil or ethylene glycol. Within the dampening fluid, rolling bodies are arranged to be freely movable. Should an unbalance occur in the rotary body during operation thereof, the rolling bodies will roll around the annular cavity and will assume, under the action of the components of force set up by the unbalance, positions in which they compensate for the out of balance. The specification also discloses the use of a solid but low melting point damping medium which can render the balls substantially immovable when cold, for example during a starting period or during any other phase of operation. The damping medium may be melted either by friction occurring during operation of the rotating body or by external heating.

The disadvantage with the device having a damping fluid described above is that the rolling bodies will tend to move out of their balancing positions when the device is at rest so that the device will always be out of balance when it is started from rest and will not be in balance until it has been rotated above its resonant frequency speed.

The disadvantage with the device having a low melting point damping medium described above is that heating of the damping medium causing it to melt and allowing the rolling bodies to move will occur in use of the device so that when the bodies can move out of the balancing positions if the device is not rotating just above its resonant frequency speed and the bodies could then act to increase the out of balance of the device.

It is an object therefore of the present invention to provide a method and means for balancing a rotor in which the rotor, once balanced, remains permanently balanced.

The applicants co-pending U.S. Pat. Appliction Ser. No. 625242, pending in Group 230 discloses a rotor balancing arrangement in which a rotor to be balanced has an annular cavity containing two balls free to roll around the cavity. An initially inert heat sensitive adhesive is coated around the cavity and the rotor is rotated to a speed just have its first resonant frequency vibration so that the balls take up balancing positions in the cavity counter-balancing the out-of-balance of the shaft. The adhesive is then activated by an external heat source to lock the balls in the balancing position so that the shaft is permanently balanced. In the latter arrangement balls are required which are free to rotate around the inner surface of the annular cavity until they reach the balancing position and it is an object of the present invention to provide an arrangement which avoids the rolling of weights around the annular cavity.

SUMMARY OF THE INVENTION

The invention provides a rotor balancing device comprising a plurality of weights, means for each weight to mount the weights both for rotation about the rotor axis and for radial movement with respect to the axis, the arrangement being such that the weights are prevented from moving into axial alignment with each other along the rotor axis, and means to secure the weights in fixed positions against both radial and rotational movement with respect to the rotor whereby the weights can be allowed to assume positions to counter balance any out-of-balance in the shaft when the shaft is rotated to a balancing speed in which it is between natural frequencies of vibration and is nearer the lower frequency (i.e. is in a mass controlled state) and can then be locked in said positions permanently to balance the shaft.

BRIEF DESCRIPTION OF THE DRAWINGS

FIG. 1 is a diagrammtic view of part of a vehicle propeller shaft incorporating a balancing device, and FIGS. 2 to 6 show various similar forms of balance devices.

DESCRIPTION OF THE PREFERRED EMBODIMENTS

Referring firstly to FIG. 1 of the drawings there is shown a vehicle propeller shaft 10 which comprises a hollow tube in which a balancing device indicated at 11 is mounted. The balancing device comprises a cup-shaped housing 12 comprising a flat circular base 13 and a cylinder peripheral wall 14 which engages with an interference fit in the tubular propeller shaft. The base 13 has an upstanding pivot 15 concentric with the wall 14 on which two cylindrical bushes 16 are rotatably mounted. Two "bob" weights 17 are mounted to rotate with the bushes 16 by tension springs 18 respectively. The outer surface of each "bob" weight 17 has a coating of contact adhesive 19 and the inner surface of the housing 14 has a frictional surface 20 or vice versa. The weights 17 are arranged so that their paths just overlap to prevent the weights moving into axial alignment of each other.

The propeller shaft is rotated to a balancing speed in which the shaft is between natural frequencies of vibration and is nearer the lower frequency (i.e. is in a mass controlled state) and this causes the "bob" weights 17 to move into position which counterbalance any out of balance in the shaft. The springs 18 are selected so that at that speed, the centrifugal force acting on the weights is sufficient to draw the weights outwardly into engagement with the inner surface of the housing wall and the weights are then secured in those positions by the contact adhesive. Thus when the shaft slows down, the weights remain in the counterbalancing positions and the shaft is balanced for all speeds.

FIG. 2 shows a modification in which each tension spring 18 is replaced by a compression spring 21 and each weight 17 is retained against outward movement into engagement with the outer wall of the housing by a restraining thread 22 connected between the weights 17 and its respective bearing 16 which is arranged to snap, extend or tobe fused by electrical means when the propeller shaft reaches said balancing speed.

In the arrangement shown in FIG. 3, the thread 22 is retained and the compression spring 21 is replaced by a locking device which is connected between the "bob" weights 17 and its bearing 16 which permits the "bob" weight to move radially outwardly into engagement with the housing peripheral wall but prevents return of the "bob" weight. In the example shown the locking device comprises an over-centre linkage 23.

FIG. 4 shows a similar arrangement to that of FIG. 1 except that the "bob" weights 17 are pivotally mounted on swing arms 24 connected to the respective bearings 16 to swing in planes containing the pivot axis and the tension springs 18 are provided to prevent outward pivoting of the "bob" weights until said balancing speed is reached. In this case the outer wall 14 of the housing has an inwardly projecting V-section annulus 25 which is provided on either flank thereof with contact adhesive or frictional surface for engagement with the frictional surfaces or contact adhesive on the "bob" weights 17 as described earlier.

FIG. 5 shows a further construction in which the bearings 16 are axially slidable along the pivot and the "bob" weights 17 have contact adhesive on the sides thereof adjacent the base 13 of the housing and the base 13 has an upstanding shoulder 26 provided with a frictional face 27. Alternatively the contact adhesive could be provided on the shoulder 26 and the frictional faces provided on the weights 17. A spring 28 restrained by a severable thread 28a is provided for moving the bearings 16 towards the bottom face of the housing 13. When the shaft reaches said balancing speed and the thread is severed and the bearings are moved axially of the pivot to secure the weights to the shoulder in counterbalancing positions as described earlier.

In FIG. 6, each "bob" weight 17 is connected to it bearing 16 by a frictional telescopic strut 28 and the outer face of the "bob" weight 17 has a layer of contact adhesive and the peripheral wall 14 of the housing has a frictional surface or vice versa as described with respect to FIG. 1. The frictional telescopic arm is arranged to release the "bob" weight 17 when the propeller shaft reaches the balancing speed and the "bob" weights 17 move into counterbalancing positions as described earlier and are then secured to the wall of the housing by the contact adhesive to balance permanently the shaft. In a modification of the arrangement shown in FIG. 6 the outer face of the "face" weights 17 and the wall 14 of the housing are provided with axially extending splines which prevent the weights moving circumferentialy around the housing and the telescopic struts 28 prevent the weights from moving inwardly of the wall of the housing so that the weights are locked permanently in their counterbalancing positions.

It will be appreciated that many modifications may be made to the above described embodiments without departing from the scope of the invention. For example, the contact adhesive used could be replaced by a thermally activated adhesive in which case an external heating source is provided for activating the adhesive when the weights have assumed counterbalancing positions.

The contact or thermally activated adhesive could be on corresponding engaging faces of the weights and the housing or where means are provided for opposing inward movement of each weight the adhesive or splines could be replaced with suitable interengaging frictional surfaces on the weights and the housing.

I claim:

1. A rotor balancing device comprising a housing for mounting in a hollow shaft to be balanced, the housing being cup shaped and having a base wall formed with a cylindrical wall around the periphery thereof and having a pivot mounted at the center of the base concentrically with the peripheral wall, two bushes rotatably mounted on the pivot, two weights located within the housing, means connecting the two weights respectively to the two bushes to restrain the weights from engaging the peripheral wall of the housing until the rotor is rotated at a balancing speed at which the weights move around the pivot to counter-balance any out of balance in the rotor and adhesive means selectively disposed on at least one of the cylindrical walls of the housing and the weights to secure the weights in said balancing positions.

2. A device as claimed in claim 1 wherein the restraining means comprise tension springs connecting the weights to the bushes.

3. A rotor balancing device comprising a housing for mounting in a hollow rotor shaft to be balanced, the housing being cup-shaped and having a base wall formed with a cylindrical wall arund the periphery thereof and having a pivot mounted at the center of the base concentrically with the peripheral wall, two bushes rotatably mounted on the pivot, two weights located within the housing, means connecting the two weights respectively to the two bushes to restrain the weights from engaging the peripheral wall of the housing until the rotor is rotated at a balancing speed in which the weights move around the pivot to counterbalance any out of balance in the rotor and adhesive means on at least one of the cylindrical walls of the housing and the weights to secure the weights in said balancing positions, the paths of the weights around the pivot overlapping to prevent the weights moving into alignment in a direction parallel to the pivot axis.

4. A rotor balancing device comprising a housing for mounting in a hollow rotor shaft to be balanced, the housing being cup-shaped and having a base wall formed with a cylindrical wall around the periphery thereof and having a pivot mounted at the center of the base concentrically with the peripheral wall, two bushes rotatably mounted on the pivot, two weights located within the housing, means connecting the two wights respectively to the two bushes to restrain the weights from engaging the peripheral wall of the housing until the rotor is rotated at a balancing speed in which the weights move around the pivot to counterbalance any out of balance in the rotor and adhesive means on at least one of the cylindrical walls of the housing and the weights to secure the weights in said balancing position, restraining means comprising threads extending between the weights and bushes and arranged to allow the weights to engage the adhesive means when said shaft is rotated to said balancing speed and means are provided for opposing inward movement of each weight to prevent dis-engagement from the adhesive means.

5. A device as claimed in claim 4 wherein the means to oppose inward movement of each weight comprise a spring biassed over-centre linkage between each weight and its respective bush which moves over-centre when the weights move out to engage the contact adhesive and then acts to prevent the weights from moving radially inwardly.

6. A device as claimed in claim 4 wherein the means to hold the weights outwardly in engagement with the adhesive comprise compression springs acting between the bushes and the respective weights.

7. A rotor balancing device comprising a housing for mounting in a hollow rotor shaft to be balanced, the housing being cup-shaped and having a base wall formed with a cylindrical wall around the periphery thereof and having a pivot mounted at the center of the base concentrically with the peripheral wall, two bushes rotatably mounted on the pivot, two weights located within the housing, means connecting the two weights respectively to the two bushes to restrain the weights from engaging the peripheral wall of the housing until the rotor is rotated at a balancing speed in which the weights move around the pivot to counterbalance any out of balance in the rotor and adhesive means on at least one of the cylindrical walls of the housing and the weights to secure the weights in said balancing positions, the connecting means for each weight comprising a swing arm, connecting the weight to its respective bush to allow the weight to swing in a plance containing the pivot axis and spring means are provided for biassing the weights radially inwardly towards the axis, the spring force being overcome by a centrifugal force when the rotor reaches said balancing speed.

8. A rotor balancing device comprising a housing for mounting in a hollow rotor shaft to be balanced, the housing being cup-shaped and having a base wall formed with a cylindrical wall around the periphery thereof and having a pivot mounted at the center of the base concentrically with the peripheral wall, two bushes rotatably mounted on the pivot, two weights located within the housing, means connecting the two weights respectively to the two bushes to restrain the weights from engaging the peripheral wall of the housing until the rotor is rotated at a balancing speed in which the weights move around the pivot to counterbalance any out of balance in the rotor, the connecting means for each weight comprising a telescopically extendible arm connecting the weight to its respective bush which arm has a frictional resistance to extension or contraction to prevent the weight from moving outwaardly until the rotor is rotating at its balancing speed and means are provided on at least one of the weights and the peripheral wall of the housing to secure the weights against rotation around the housing on engagement of the weights with the wall.

9. A device as claimed in claim 8 wherein the securing means comprise contact or thermally activated adhesive of the housing wall and/or the weights.

10. A device as claimed in claim 8 wherein the wall of the housing and the weights are provided with axially extending splines for inter-engagement when the weights move out to the wall to prevent movement of the weights around the wall.

11. A rotor balancing device comprising a housing for mounting in a hollow roto shaft to be balanced, the housing being cup-shaped and having a base wall formed with a cylindrical wall around the periphery thereof and having a pivot mounted at the center of the base concentrically with the peripheral wall, two bushes rotatably mounted on the pivot, two weights located within the housing, means connecting the two weights respectively to the two bushes to permit the weights to move around the pivot with respect to the housing to counterbalance any out of balance in the rotor when the rotor is rotated to a balancing speed, the bushes on the pivot being axially slidable along the pivot, adhesive selectively provided on at least one of the base of the housing and the sides of the weights adjacent the base of the housing and means for urging the bushes in a direction to engage the weights with the base of the housing when said rotor reaches the balancing speed.

* * * * *